(12) United States Patent
Saito et al.

(10) Patent No.: US 9,222,543 B2
(45) Date of Patent: Dec. 29, 2015

(54) LIQUID-SEALED-TYPE ANTI-VIBRATION DEVICE AND METHOD FOR MANUFACTURING THE SAME

(75) Inventors: Akihiro Saito, Yokohama (JP); Katsumi Someya, Yokohama (JP)

(73) Assignee: BRIDGESTONE CORPORATION, Tokyo (JP)

(*) Notice: Subject to any disclaimer, the term of this patent is extended or adjusted under 35 U.S.C. 154(b) by 229 days.

(21) Appl. No.: 13/636,021

(22) PCT Filed: Mar. 3, 2011

(86) PCT No.: PCT/JP2011/001270
§ 371 (c)(1),
(2), (4) Date: Nov. 26, 2012

(87) PCT Pub. No.: WO2011/114643
PCT Pub. Date: Sep. 22, 2011

(65) Prior Publication Data
US 2013/0069288 A1    Mar. 21, 2013

(30) Foreign Application Priority Data

| Mar. 19, 2010 | (JP) | 2010-064951 |
| Apr. 23, 2010 | (JP) | 2010-100024 |
| May 7, 2010 | (JP) | 2010-107596 |

(51) Int. Cl.
F16F 13/00    (2006.01)
F16F 13/16    (2006.01)
F16F 13/14    (2006.01)

(52) U.S. Cl.
CPC ............. *F16F 13/16* (2013.01); *F16F 13/1481* (2013.01); *Y10T 29/49826* (2015.01)

(58) Field of Classification Search
USPC ........................ 267/140.13, 140.14, 292, 293; 296/190.01, 190.07, 35.1
See application file for complete search history.

(56) References Cited

U.S. PATENT DOCUMENTS 4,739,979 A * 4/1988 Kanda ....................... 267/140.12
4,832,319 A * 5/1989 Noguchi et al. .......... 267/140.13
(Continued)

FOREIGN PATENT DOCUMENTS

| CN | 102884338 A | 1/2013 |
| JP | 9-329179 A | 12/1997 |

(Continued)

OTHER PUBLICATIONS

International Search Report for PCT/JP2011/001270 dated Apr. 26, 2011.

(Continued)

*Primary Examiner* — Robert A Siconolfi
*Assistant Examiner* — James Hsiao
(74) *Attorney, Agent, or Firm* — Sughrue Mion, PLLC

(57) ABSTRACT

The present invention provides a liquid-sealed-type anti-vibration device that achieves damping performance as well as durability, the device comprising: an inner-tube member; an outer-tube member; first and second rubber bodies; and a fluid chamber, wherein a partition member, which is provided on the inner-tube member and has an inner-tube rigid protrusion and a rubber partition, is provided with a limiting passage, the outer-tube member has first and second outer-tube rigid protrusions having a shape of an inward flange, at least one of the first and second outer-tube rigid protrusions is disposed on the side of liquid chambers, each of the first rubber body and the second rubber body is provided with a ring-shaped cavity extending inside the respective rubber body along the outer circumferential surface of the inner-tube member, the depth of the cavities being configured such that the cavities extend beyond the first outer-tube rigid protrusion or the second outer-tube rigid protrusion, and at least one of the cavities faces one of the liquid chambers.

6 Claims, 10 Drawing Sheets

(56) References Cited

U.S. PATENT DOCUMENTS

| | | | |
|---|---|---|---|
| 5,005,810 A * | 4/1991 | Sawada et al. | 267/140.13 |
| 5,195,728 A * | 3/1993 | Skipper | 267/140.13 |
| 5,690,320 A * | 11/1997 | Kanda | 267/140.12 |
| 6,916,016 B2 * | 7/2005 | Akasa | 267/140.13 |
| 6,981,696 B2 * | 1/2006 | Hatano et al. | 267/140.12 |
| 2003/0098534 A1 | 5/2003 | Graeve | |
| 2003/0214086 A1* | 11/2003 | Akasa | 267/140.13 |
| 2007/0246870 A1 | 10/2007 | Siemer et al. | |
| 2009/0321202 A1* | 12/2009 | Hamada et al. | 188/322.5 |

FOREIGN PATENT DOCUMENTS

| | | | |
|---|---|---|---|
| JP | 10-132016 A | 5/1998 | |
| JP | 10-141425 A | 5/1998 | |
| JP | 2002-364698 A | 12/2002 | |
| JP | 2003-533654 A | 11/2003 | |
| JP | 2004-278706 A | 10/2004 | |
| JP | 2006-46555 A | 2/2006 | |
| JP | 2007-527488 A | 9/2007 | |
| JP | 2011-185356 A | 9/2011 | |
| WO | 2009/100205 A1 | 8/2009 | |

OTHER PUBLICATIONS

Chinese Office Action, dated Jan. 6, 2014, issued in corresponding Chinese Patent Application No. 201180022809.9.

* cited by examiner

FIG. 9
(a)
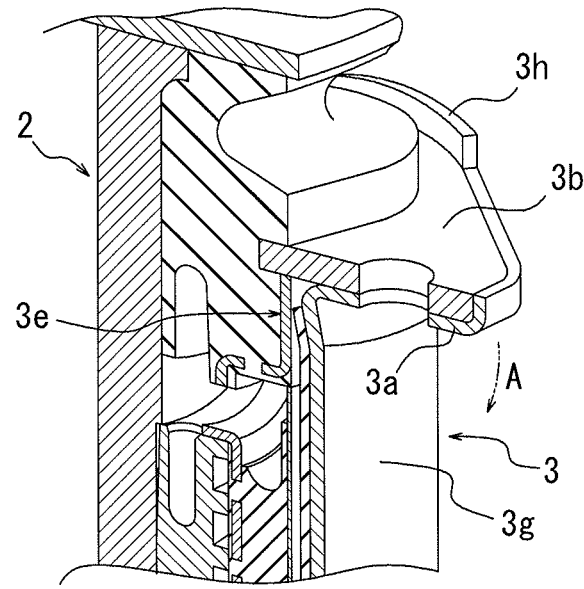
(b)
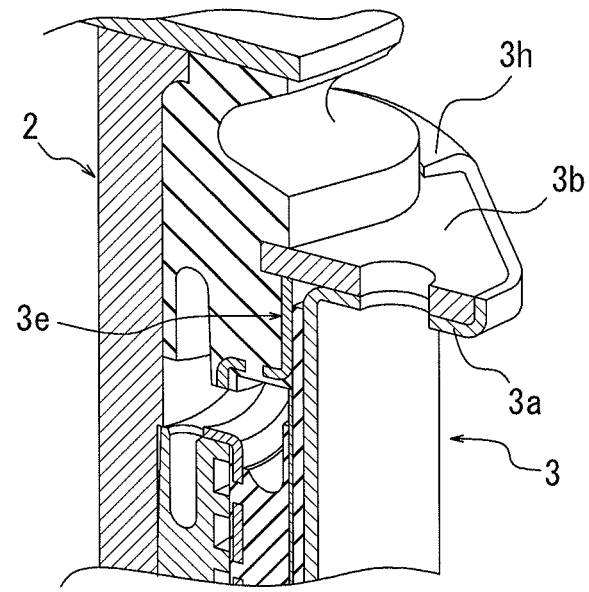

LIQUID-SEALED-TYPE ANTI-VIBRATION DEVICE AND METHOD FOR MANUFACTURING THE SAME

CROSS REFERENCE TO RELATED APPLICATIONS

This application is a National Stage of International Application No. PCT/JP2011/001270 filed Mar. 3, 2011, claiming priority based on Japanese Patent Application Nos. 2010-064951 filed Mar. 19, 2010, 2010-100024 filed Apr. 24, 2010 and 2010-107596 filed May 7, 2010, the contents of all of which are incorporated herein by reference in their entirety.

TECHNICAL FIELD

The present invention relates to a liquid-sealed-type anti-vibration device suitable for use as a cabin mount, an engine mount and the like of a vehicle and a method for manufacturing the same. The present invention particularly proposes a technology for a liquid-sealed-type anti-vibration device capable of achieving at a high level excellent damping performance against a vibration input as well as durability of rubber.

BACKGROUND ART

A conventional anti-vibration device for preventing the vibration generated at the unsprung side of the vehicle from being transmitted to the cabin has, for example, liquid sealed inside the device, as disclosed in Patent Document 1.

As schematically shown in the longitudinal-sectional perspective view of FIG. 10, the liquid-sealed-type anti-vibration device disclosed in Patent Document 1 comprises an inner-tube member 102; an outer-tube member 103 disposed coaxially with the inner-tube member 102 so as to relatively displace in an axial direction with respect to the inner-tube member 102 as vibration is input to the device; a pair of rubber bodies 104a and 104b for connecting the ends of the outer-tube member 103 to the outer circumferential surface of the inner-tube member 102 in a liquid-tight manner; and a fluid chamber 105 configured in such a way that the space defined by the pair of rubber bodies 104a, 104b is sealingly filled with non-compressible liquid. The intermediate section of the inner-tube member 102 in its longitudinal direction is provided with an inner-tube rigid protrusion 106 extending along the entire circumference of the inner-tube member 102. The inner-tube rigid protrusion 106 protrudes toward the outer-tube member 103 and is rubber lined. A rubber partition 108 is provided so as to connect the outer circumferential surface of the inner-tube rigid protrusion 106 and the inner circumferential surface of the outer-tube member 103 in a liquid-tight manner and to partition the fluid chamber 105 into two liquid chambers 107a, 107b. The inner-tube rigid protrusion 106 is provided with a limiting passage 109 for communicating the liquid chambers 107a, 107b with each other.

According to the liquid-sealed-type anti-vibration device 101, it is possible to damp the vibration input by the member on the vibration-generating side and isolate the vibration from the member on the vibration-transmitted side, by means of the liquid column resonance inside the passage generated as the liquid inside the liquid chambers 107a, 107b flows through the limiting passage 109, the flow resistance of the liquid flowing through the limiting passage, and the deformation of the elastic members and the like.

Normally, in such a liquid-sealed-type anti-vibration device 101, in order to achieve sufficient damping performance, more liquid flow through the limiting passage 109 is needed. For this reason, the liquid-sealed-type anti-vibration device 101 disclosed in Patent Document 1 is further configured in such a way that the axial end sections of the outer-tube member 103 are provided with ring-shaped outer-tube rigid protrusions 111a, 111b, which protrude from the inner circumferential surface of the outer-tube member 103 toward the inner-tube member 102; and the rubber bodies 104a, 104b are fixed to the inner circumferential surfaces of the outer-tube rigid protrusions 111a, 111b. In response to the input of vibration, for example, the inner-tube rigid protrusion 106, which displaces upward and downward in conjunction with the inner-tube member 102, moves closer to and away from these outer-tube rigid protrusions 111a, 111b. Accordingly, the liquid chambers 107a, 107b may be effectively compressed or expanded upward or downward by the forces exerted on the radially inner and outer sides of the liquid chambers 107a, 107b, thereby increasing the volume change of the liquid chambers 107a and 107b in response to the input of vibration and hence enhancing the damping performance of the device.

However, in the liquid-sealed-type anti-vibration device 101, since the rubber bodies 104a, 104b are fixed to the inner circumferential surfaces of the outer-tube rigid protrusions 111a and 111b, the radial thicknesses of the rubber bodies 104a, 104b are shortened by the radially protruding lengths of the outer-tube rigid protrusions 111a and 111b. Accordingly, there is a drawback that, when a large impact force is input by the member on the vibration-generating side such that the relative displacement of the inner-tube member 102 and the outer-tube member 103 in the axial direction is particularly large for example, the rubber bodies 104a, 104b are subjected to extreme shear deformation, and thereby the rubber fatigue quickly progresses.

Since the sectional areas of the rubber bodies 104a, 104b in the section including the central axis are small, the rubber bodies 104a, 104b are not capable of withstanding the shear deformation. Accordingly, the fixing surfaces between the outer-tube rigid protrusions 111a, 111b and the rubber bodies 104a, 104b are prone to experiencing concentration of stress, and hence separation.

If the rubber bodies 104a, 104b experience fatigue breakage and the like, the vibration at the unsprung side of the vehicle is directly transmitted to the cabin, thereby decreasing the passenger comfort, and in addition, the vibration adversely affects other devices in the vehicle, thereby inducing secondary failures and potentially causing a severe vehicle malfunction or accident.

Accordingly, in such a liquid-sealed-type anti-vibration device, excellent damping performance as well as excellent durability are required, however, the technology disclosed in Patent Document 1 is not sufficient. Further consideration is needed to prevent particularly the fatigue breakage of the rubber bodies.

In this regard, for example, Patent Document 2 discloses a technology in which a damping plate is provided radially outward of an inner-tube seal member such that upward and downward displacement of the damping plate creates flow of high viscous liquid, thereby achieving damping by means of the shear resistance of the high viscous liquid. In a case where improved damping performance at a certain frequency range is desired, it is sometimes preferable to use low viscous liquid, however, in such a case, sufficient damping performance cannot be achieved by the aforementioned damping plate. Accordingly, the technology disclosed in Patent Document 2 is not highly adaptable to the vibration at frequencies outside of the certain frequency range.

For example, Patent Documents 3 and 4 disclose technologies in which a protruding portion having a limiting passage (orifice passage) therein is formed on an outer-tube member, thereby achieving damping performance by means of the flow resistance of the liquid flowing through the limiting passage. However, in these technologies, since the protruding portion does not move with the upward and downward displacement of an inner-tube member, it is not possible to achieve large volume change of liquid chambers by the upward and downward displacement of the protruding portion.

PATENT DOCUMENTS

Patent Document 1: WO 2009/100205 A1
Patent Document 2: JP 9-329179 A
Patent Document 3: JP 2004-278706 A
Patent Document 4: JP 2002-364698 A

SUMMARY OF THE INVENTION

Problem to be Solved by the Invention

In light of the aforementioned drawbacks, the main object of the present invention is to provide a liquid-sealed-type anti-vibration device capable of enhancing the damping performance of the device by enlarging the volume change of the liquid chambers in response to the input of vibration, and having excellent durability by preventing fatigue breakage of the rubber bodies. Another object of the present invention is to provide a liquid-sealed-type anti-vibration device which is capable of the required liquid to be sealingly filled at atmospheric pressure, has a simple structure, enables easy processing, enables simple and easy inserting and press-fitting and the like of the anti-vibration device or of the outer tube to a required subject and effectively reduces the force required to press-in and the like the outer tube, and a method for manufacturing the same.

Means for Solving the Problem

A liquid-sealed-type anti-vibration device of the present invention comprises:

an inner-tube member to be connected to a member on either one of a vibration-generating side and a vibration-transmitted side;

an outer-tube member located outside of the inner-tube member, to be connected to a member on the other one of the vibration-generating side and the vibration-transmitted side;

a first rubber body for connecting one end of the outer-tube member with an outer circumferential surface of the inner-tube member in a liquid-tight manner;

a second rubber body for connecting the other end of the outer-tube member with the outer circumferential surface of the inner-tube member in a liquid-tight manner; and a fluid chamber configured in such a way that a space defined by the first rubber body, the second rubber body, the inner-tube member and the outer-tube member is sealingly filled with non-compressible liquid, wherein the inner-tube member is provided with an inner-tube rigid protrusion at an intermediate section of the inner-tube member in an axial direction, the protrusion protruding from the outer circumferential surface of the inner-tube member toward the outer-tube member and extending over an entire circumference of the inner-tube member, a rubber partition is provided to connect an outer circumferential surface of the inner-tube rigid protrusion and an inner circumferential surface of the outer-tube member with each other in a liquid-tight manner to divide the fluid chamber into two liquid chambers with the inner-tube rigid protrusion, and the inner-tube rigid protrusion is provided with a limiting passage which allows the liquid chambers to communicate with each other, the outer-tube member has: a first outer-tube rigid protrusion protruding from the inner circumferential surface of the outer-tube member toward the inner-tube member through the first rubber body and having a shape of an inward flange; and a second outer-tube rigid protrusion protruding from the inner circumferential surface of the outer-tube member toward the inner-tube member through the second rubber body and having a shape of an inward flange, and at least one of the first outer-tube rigid protrusion and the second outer-tube rigid protrusion is located on the side of the liquid chamber, and each of the first rubber body and the second rubber body is provided with a ring-shaped cavity extending inside the respective rubber body along the outer circumferential surface of the inner-tube member and having a depth, in a section that includes a central axis of the inner-tube member and that is taken along the central axis, beyond the first outer-tube rigid protrusion or the second outer-tube rigid protrusion, at least one of the cavities facing one of the liquid chambers.

The inner-tube rigid protrusion may be integrally formed with the inner-tube member or may be formed separately from the inner-tube member on the basis of its structure. The outer-tube rigid protrusions may be integrally formed with the outer-tube member or may be formed separately from the outer-tube member on the basis of its structure.

Regarding the outer-tube rigid protrusions, the term "a shape of an inward flange" indicates that, in the aforementioned section, the widths of the outer-tube rigid protrusions are sufficiently small with respect to the distance from the inner circumferential surface of the body of the outer-tube member to the protruding ends of the outer-tube rigid protrusion disposed radially inward, i.e. the protruding heights of the outer-tube rigid protrusions. The outer-tube rigid protrusions may protrude radially inward in a straight line and then terminate. Alternatively, the outer-tube rigid protrusions may extend such that their inner-circumferential end portions are curved toward the inner-tube rigid protrusion and then terminate.

Regarding the first or second outer-tube rigid protrusion, the term "located on the side of the liquid chambers" indicates that the outer-tube rigid protrusion is positioned such that the width of the portion of the rubber body which covers the surface of the outer-tube rigid protrusion on the side of the inner-tube rigid protrusion is less than or equal to 5 mm. The width may be 0 mm. In such a case, the outer-tube rigid protrusion is exposed to one of the liquid chambers.

Regarding the cavities, the phrase "depth beyond the first outer-tube rigid protrusion or the second outer-tube rigid protrusion" indicates that the depth of each of the cavities is configured such that, in the aforementioned section, the cavity intersects with the extension of the central line of the width of either one of the first outer-tube rigid protrusion and the second outer-tube rigid protrusion that is located closer to the cavity than the other. However, in a case where the inner-circumferential end portion of the outer-tube rigid protrusion is curved toward the inner-tube rigid protrusion, the depth of the cavity is configured such that the cavity intersects with the extension of the central line of the width of the portion of the outer-tube rigid protrusion other than the curved portion.

In the invention according to claim 1, it is preferable that, in the aforementioned section, the inner-circumferential end portion of at least one of the first outer-tube rigid protrusion and the second outer-tube rigid protrusion is curved toward the inner-tube rigid protrusion, and the vertex surface or the bottom surface of the cavity provided in the first rubber body or the second rubber body in which the respective outer-tube rigid protrusions are embedded, has a mild convex curved shape.

The term "a mild convex curved shape" indicates that the cavity is shaped such that, in the aforementioned section, the contour line of the cavity is not bent, and the curvature radius of the contour line at each point on the contour line is greater than or equal to 1.5 mm.

In the invention according to claim 1 or 2, it is preferable that a protruding height of the inner-tube rigid protrusion from a largest-outer-diameter section of the inner-tube member is in a range of 50%-80% of a radial distance from the largest-outer-diameter section to an inner circumferential surface of a body of the outer-tube member, and protruding heights of the first outer-tube rigid protrusion and the second outer-tube rigid protrusion are in a range of 50%-80% of the radial distance.

The term "an inner circumferential surface of a body of the outer-tube member" refers to the inner circumferential surface of the portion of the outer-tube member other than the outer-tube rigid protrusions. In a case where the outer-tube member has the intermediate tube, the support tube and the like on its inner circumferential side, the term refers to the inner circumferential surface of one of these members that is located at the radially innermost position.

In the invention according to any one of claims 1 to 3, it is preferable that a thickness of the rubber partition in the axial direction is the shortest at a region located circumferentially outward of the position of the bisection point between an inner circumferential surface and outer circumferential surface of the rubber partition.

In the invention according to any one of claims 1 to 4, it is preferable that an end portion of the outer-tube member on the side of one of the rubber bodies is provided with a small-diameter end section having an outer diameter smaller than an outer diameter of an end portion of the outer-tube member on the side of the other one of the rubber bodies and an outer diameter of a portion of the outer-tube member corresponding to the mounting position of the rubber partition, and the small-diameter end section is provided with a liquid injection inlet sealed by a plugging member.

The method for manufacturing a liquid-sealed-type anti-vibration device according to claim 5 comprises:

injecting liquid from the liquid injection inlet provided in the outer-tube member after assembling of component members of the device, and subsequently to the injecting, sealing the liquid injection inlet by the plugging member.

Effect of the Invention

In the liquid-sealed-type anti-vibration device of the present invention, the outer circumferential surface of the inner-tube member is provided with the inner-tube rigid protrusion, and the inner circumferential surface of the outer-tube member is provided with the first outer-tube rigid protrusion and the second outer-tube rigid protrusion. Accordingly, upon a vibration input, the inner-tube rigid protrusion and the outer-tube rigid protrusions move closer to or away from each other, thereby increasing the volume change of the liquid chambers. Therefore, similarly to the liquid-sealed-type anti-vibration device disclosed in Patent Document 1, it is possible to achieve excellent vibration-damping performance.

In the conventional liquid-sealed-type anti-vibration device disclosed in Patent Document 1, the inner circumferential surface of the outer-tube member is provided with the ring-shaped first outer-tube rigid protrusion and second outer-tube rigid protrusion, the inner circumferential surfaces of these outer-tube rigid protrusions are fixed to the rubber bodies, and the substantial volumes of the rubber bodies are not sufficiently large. Accordingly, in the conventional device, there is a drawback in that as impact vibration is input, the rubber bodies are subjected to extreme shear deformation, and thereby the rubber fatigue quickly progresses as discussed above. According to the liquid-sealed-type anti-vibration device of the present invention, since each of the outer-tube rigid protrusions has a shape of an inward flange such that its axial width is sufficiently small with respect to its radial height (protruding length), the volumes of the rubber bodies may be sufficiently large, and the shear deformation of the rubber bodies in response to a vibration input may be effectively dispersed, thereby suppressing the progression of the rubber fatigue.

In addition, since the depths of the ring-shaped cavities are configured such that the cavities extend beyond the outer-tube protrusions, upon relative displacement of the inner-tube member and outer-tube member in the axial direction, the rubber portions around the cavities sufficiently bend, thereby mitigating the concentration of stress at the fixing surfaces between the rubber bodies and outer-tube rigid protrusions. Accordingly, it is possible to reduce the separation at the fixing surfaces.

On the other hand, as in the conventional liquid-sealed-type anti-vibration device, if the depths of the cavities are configured such that the cavities do not extend beyond the outer-tube rigid protrusions, the rubber portions near the cavities do not sufficiently bend, and thus it is not possible to mitigate the concentration of stress at the fixing surfaces and to reduce the separation at the fixing surfaces.

According to the present invention, a liquid-sealed-type anti-vibration device which has excellent damping performance, effectively reduces separation due to progression of fatigue of the rubber bodies and concentration of stress at the fixing surfaces between the rubber bodies and outer-tube rigid protrusions, and has significantly improved durability, may be provided.

According to the liquid-sealed-type anti-vibration device of the present invention, since at least one of the first outer-tube rigid protrusion and the second outer-tube rigid protrusion is located on the side of the liquid chambers, a large portion of rubber resides on the opposite side of the liquid chambers with respect to the outer-tube rigid protrusion, and thereby it is possible to more effectively disperse the shear deformation of the rubber bodies upon a vibration input.

In the liquid-sealed-type anti-vibration device of the present invention, in a case where, in the aforementioned section, an inner-circumferential end portion of at least one of the first outer-tube rigid protrusion and the second outer-tube rigid protrusion is curved toward the inner-tube rigid protrusion, it is possible to reduce the chance of separation at the fixing surfaces around the inner-circumferential end portion due to rubber deformation upon an vibration input. Further, in a case where a vertex surface or a bottom surface of the cavity provided in the first rubber body or the second rubber body, in which the respective outer-tube rigid protrusions are embedded, has a mild convex curved shape, the rubber portion around the cavity may bend more evenly, and thereby concentration of stress may be more effectively reduced.

In the liquid-sealed-type anti-vibration device of the present invention, in a case where a protruding height of the inner-tube rigid protrusion from a largest-outer-diameter section of the inner-tube member is in a range of 50%-80% of a radial distance from the outer circumferential surface of the inner-tube member to the inner circumferential surface of the outer-tube member, and protruding heights of the outer-tube rigid protrusions are in a range of 50%-80% of the distance, the damping performance as well as the durability of the device may be effectively achieved.

This is to say that, in a case where the protruding heights of each of the protrusions are less than 50% of the distance, there is a risk that the volume change of the liquid chambers may not be sufficiently large, and thereby the damping performance may not be sufficiently improved. On the other hand, in a case where the protruding height of the inner-tube rigid protrusion is greater than 80% of the distance, there is a risk that the rubber partition may be more prone to progression of fatigue. In a case where the protruding heights of the outer-tube rigid protrusions are greater than 80% of the distance, there is a risk that the widths of the cavities may not be sufficiently large, and thereby the rubber portions near the inner-circumferential end portions of the outer-tube rigid protrusions may experience concentration of stress.

In the liquid-sealed-type anti-vibration device of the present invention, in a case where a thickness of the rubber partition is the shortest at a region located circumferentially outward of the position of a bisection point between an inner circumferential surface and an outer circumferential surface of the rubber partition, upon relative displacement of the inner-tube member and the outer-tube member in the axial direction, the rubber partition may bend at its portion near the radially outermost side. Accordingly, a larger portion of rubber may deform with the displacement of the inner-tube rigid protrusion, thereby increasing the volume change of the liquid chambers. Therefore, it is possible to further improve the damping performance of the device.

In a case where the small-diameter end section of the outer-tube member is provided with a liquid injection inlet sealed by a plugging member, the liquid may be sealed inside the liquid chambers at atmospheric pressure in such a way that, upon assembling of the component members of the device, required liquid is injected from the liquid injection inlet provided in the small-diameter end section at one end portion of the outer-tube member and is filled inside the liquid chambers by means of negative pressure suction or by immersing the device in the liquid for example; and subsequently the liquid injection inlet is sealed by the plugging member such as a blind rivet, screw, bolt and the like. Accordingly, it is possible to sufficiently eliminate the risk of initial deformation of the rubber bodies and hence the risk of degradation of the durability of the rubber bodies.

In this device, in which the small-diameter end section is provided at one end portion of the outer-tube member, the small-diameter end section may be preliminarily formed, so that the diameter reduction process and the like for forming the small-diameter end section is not required after mounting the outer-tube member. Accordingly, it is possible to sufficiently decrease the number of steps for processing the outer-tube member and to reduce the manufacturing cost of the device, while sufficiently eliminating the risk of deformation of the liquid injection inlet due to the diameter reduction process and the like.

In this anti-vibration device, since the one end portion of the outer-tube member has the small-diameter end section, as the outer-tube member is inserted or press-fitted and the like into a predetermined mounting member for preparing the device for use, the small-diameter end section of the outer-tube member may serve as a guide section for inserting or press-fitting and the like while it is entered to the mounting member. Accordingly, it is possible to perform the required inserting or press-fitting and the like without initially positioning the outer-tube member in a precise manner, and thereby to easily and quickly perform the inserting or press-fitting and the like.

As the outer-tube member is press-fitted and the like into the mounting member, only the large-diameter portion of the outer-tube member other than the small-diameter end section needs to be pressed-in to the mounting member. For this reason, it is possible to reduce the total frictional force exerted between the outer-tube member and the mounting member and thereby to effectively reduce the required press-in force.

According to the anti-vibration device, upon an input or relative vibration of the inner and outer tube members in the axial direction, the rubber bodies are subjected to shear deformation, thereby isolating the input and vibration from the member on the transmitted side and damping the input and vibration. Further, the deformation of the rubber bodies causes change in volumes of the liquid chambers and hence in pressure of the liquid inside the liquid chambers, which creates flow of liquid between the liquid chambers, thereby effectively isolating and damping the input and vibration.

The method for manufacturing a liquid-sealed-type anti-vibration device of the present invention particularly comprises: injecting, liquid from the liquid injection inlet provided in the outer-tube member into the liquid chambers by an appropriate method so as to fill the liquid chambers with the liquid after assembling of component members of the device; and, subsequently to the injecting, sealing the liquid injection inlet at atmospheric pressure by the plugging member. Accordingly, the liquid chambers may be completely filled with the liquid at atmospheric pressure, and thereby it is possible to sufficiently prevent initial deformation of the rubber bodies and to sufficiently eliminate the risk of degradation of the durability of the rubber bodies.

In this case, a portion of the plugging member such as a rivet, screw, bolt, and the like for sealing the liquid injection inlet may protrude from the outer surface of the outer-tube member. However, since the liquid injection inlet itself is formed in the small-diameter end section of the outer-tube member, it is possible to sufficiently eliminate the risk of interfering between the protruding section of the plugging member and the predetermined mounting member.

BRIEF DESCRIPTION OF THE DRAWINGS

FIG. 9 is an enlarged sectional perspective view showing a portion of the device shown in FIG. 5.

EXPLANATION OF REFERENCE

Figure 1:
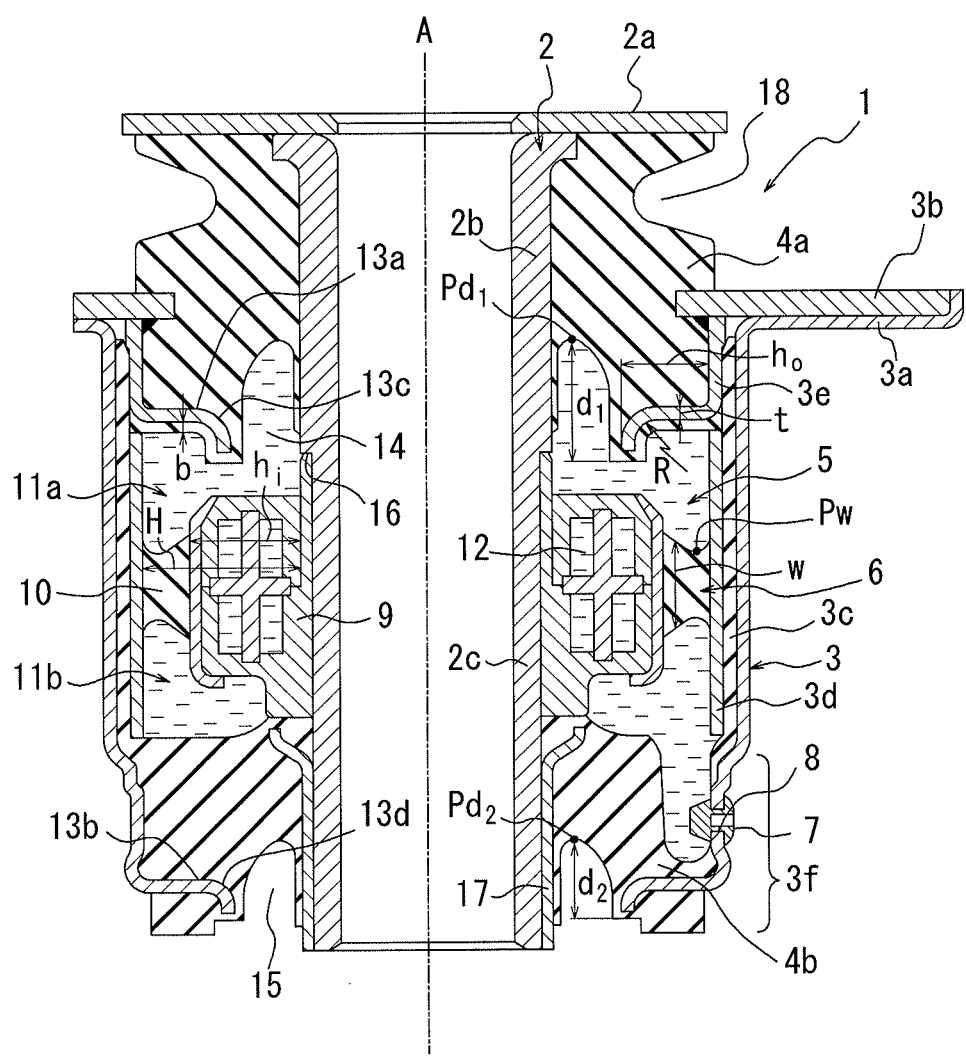
FIG. 1 is a longitudinal sectional view schematically showing an embodiment of a liquid-sealed-type anti-vibration device according to the present invention.

A: Central axis of an inner-tube member
d: Maximum depth of a recess
Pd: Maximum-depth point of a recess
Pw: Minimum-thickness point of a rubber partition
$h_i$: Radial height of an inner-tube rigid protrusion
$h_o$: Radial height of an outer-tube rigid protrusion
t: Thickness of an outer-tube protrusion
b: Thickness of a rubber portion facing an outer-tube rigid protrusion
w: Axial thickness of a rubber partition
1: Liquid-sealed-type anti-vibration device
2: Inner-tube member
2a: Annular flange
2b: Largest-outer-diameter section
2c: Smallest-outer-diameter section
3: Outer-tube member
3a: Upper-end flange
3b: Rigid reinforcement ring
3c: Rubber coating layer
3d: Support tube
3e: Intermediate tube
3f: Small-diameter end section
4a: First rubber body
4b: Second rubber body
5: Fluid chamber
6: Partition member
7: Plugging member
8: Liquid injection inlet
9: Inner-tube rigid protrusion
10: Rubber partition
11a, 11b: Liquid chamber
12: Limiting passage
13a: First outer-tube rigid protrusion
13b: Second outer-tube rigid protrusion
13c: Inner-circumferential end portion of a first outer-tube rigid protrusion
13d: Inner-circumferential end portion of a second outer-tube rigid protrusion
14, 15: Cavity
16: Step
17: Sleeve
18: Constricting section
19: Recess
20: Rigid tube body

BEST MODE FOR CARRYING OUT THE INVENTION

The present invention will be described in detail below with reference to the accompanying drawings. In the embodiment shown in FIG. 1, a liquid-sealed anti-vibration device 1 comprises an inner-tube member 2 to be mounted to a member on either one of the vibration-generating side and the vibration-transmitted side; an outer-tube member 3 located coaxially with and outside of the inner-tube member 2, to be connected to the member on the other one of the vibration-generating side and the vibration-transmitted side; a first rubber body 4a for connecting one end of the outer-tube member 3 with the outer circumferential surface of the inner-tube member 2 in a liquid-tight manner; a second rubber body 4b for connecting the other end of the outer-tube member 3 with the outer circumferential surface of the inner-tube member 2 in a liquid-tight manner; and a fluid chamber 5 configured in such a way that the space defined by the first rubber body 4a, the second rubber body 4b, the inner-tube member 2 and the outer-tube member 3 is sealingly filled with non-compressible liquid.

The inner-tube member 2 has an annular flange 2a which is secured or fixed at the vertex section of the inner-tube member 2 as shown and is used for connecting the device to the member on the one of the vibration-generating side and the vibration-transmitted side. The body section of the inner-tube member 2 has a largest-outer-diameter section 2b located on the upper side as shown and a small-outer-diameter section 2c located on the lower side as shown.

The outer-tube member 3 has an upper-end flange 3a and a rigid reinforcement ring 3b secured or fixed on top of the upper-end flange 3a, which is used for connecting the device to the member on the other of the vibration-generating side and the vibration-transmitted side with the upper-end flange 3a. The outer-tube member 3 further comprises a rubber coating layer 3c and a support tube 3d disposed circumferentially inward of the body section of the outer-tube member 3 in sequence toward the inner side, and an intermediate tube 3e which is disposed upward of the support tube 3d and inward of the rubber coating layer 3c and extends from the position of the rigid reinforcement ring 3b toward the lower side as shown. Additionally, the end portion of the outer-tube member 3 on the side of the second rubber body 4b as shown is provided with a small-diameter end section 3f having an outer diameter that is smaller than the outer diameter of the end portion of the outer-tube member 3 on the side of the first rubber body 4a and the outer diameter of a portion of the outer-tube member 3 corresponding to the mounting position of a partition member 6, which will be described hereinafter. The small-diameter section 3f is provided with a liquid injection inlet 8 sealed by a plugging member 7.

The intermediate section of the inner-tube member 2 in the direction of the central axis A of the inner-tube member 2 is provided with an inner-tube rigid protrusion 9 protruding from the outer circumferential surface of the inner-tube member 2 toward the outer-tube member 3 and extending along the entire circumference of the inner-tube member 2. The partition member 6, which has the inner-tube rigid protrusion 9 and a rubber partition 10 for connecting the outer circumferential surface of the inner-tube rigid protrusion 9 and the inner circumferential surface of the outer-tube member 3 with each other in a liquid-tight manner, divides the fluid chamber 5 into two liquid chambers 11a, 11b. The inner-tube rigid protrusion 9 is provided with a limiting passage 12 for communicating the liquid chambers 11a, 11b.

The outer-tube member 3 has a first outer-tube rigid protrusion 13a protruding from the inner circumferential surface of the outer-tube member 3 toward the inner-tube member 2 through the first rubber body 4a and having the shape of an inward flange, and a second outer-tube rigid protrusion 13b protruding from the inner circumferential surface of the outer-tube member 3 toward the inner-tube member 2 through the second rubber body 4b and having the shape of an inward flange. The first outer-tube rigid protrusion 13a is located in the first rubber body 4a on the side of the first liquid chamber 11a. In the illustrated example, the thickness b of the portion of the rubber body 4a which covers the surface of the outer-tube rigid protrusion 13a on the side of the inner-tube rigid protrusion 9 is 1 mm.

In the illustrated example, the first rubber body 4a and the second rubber body 4b are provided with ring-shaped cavities 14, 15 which extend inside the rubber bodies 4a, 4b along the outer circumferential surface of the inner-tube member 2, respectively. In the section that includes the central axis A of the inner-tube member 2 and that is taken along the central axis A, the depths $d_1$, $d_2$ of the cavities 14, 15 are configured such that the cavities 14, 15 extend beyond the first outer-tube rigid protrusion 13a and the second outer-tube rigid protrusion 13b, respectively.

The first outer-tube rigid protrusion 13a is not integrally formed with the body section of the outer-tube member 3, but is formed on the intermediate tube 3e that is connected to the rigid reinforcement ring 3b by welding. The second outer-tube rigid protrusion 13b is integrally formed with the small-diameter lower-end section of the body section of the outer-tube member 3. Alternatively, the intermediate tube 3e may be integrally formed with the rigid reinforcement ring 3b.

The inner-tube rigid protrusion 9 is fitted to the small-outer-diameter section 2c of the inner-tube member 2. An axial end of the inner-tube rigid protrusion 9 is constrained by a step 16 formed by the diameter difference between the largest-outer-diameter section 2b and the small-outer-diameter section 2c. The other axial end of the inner-tube rigid protrusion 9 is constrained by the second rubber body 4b and by a rigid sleeve 17, which is fixed to the inner circumferential surface of the second rubber body 4b so as to push up the second rubber body 4b from the lower-end side as shown.

The second liquid chamber 11b is provided with a liquid injection inlet 8 for filling liquid into the fluid chamber 5 during the manufacturing of the device. The liquid injection inlet 8 is sealed by a plugging member 7, such as a blind rivet, in a liquid-tight manner. The first rubber body 4a has a ring-shaped constricting section 18 that extends from the radially outward side toward the central axis A. By adjusting the size of the constricting section 18, the axial spring constant of the first rubber body 4a can be adjusted.

The inner-circumferential end portion 13c of the first outer-tube rigid protrusion 13a is curved toward to partition member 6 along an arc with a curvature radius R. Similarly, the inner-circumferential end portion 13d of the second outer-tube rigid protrusion 13d is curved away from the partition member 6. The vertex surface of the cavity 14 provided in the first rubber body 4a, in which the outer-tube rigid protrusion 13a is embedded, has a mild convex curved shape. The cavity 15 provided in the second rubber body 4b is configured in a similar manner.

In the liquid-sealed-type anti-vibration device 1 of the present invention, it is preferable that, as illustrated, the cavities 14, 15 are configured such that the maximum-depth points $Pd_1$, $Pd_2$ of the cavities 14, 15 are located in the vicinity of the outer circumferential surface of the inner-tube member 2. This configuration allows easier bending of the rubber bodies 4a, 4b near the outer circumferential surface of the inner-tube member 2, thereby increasing the amount of the volume changes of the liquid chambers 11a, 11b as vibration is input to the device.

In the illustrated example, the protruding height $h_i$ of the protrusion 9 and the protruding height $h_o$ of the protrusions 13a, 13b are in the range of 50%-80% of the radial distance from the outer circumferential surface of the inner-tube member 2 (the largest-outer-diameter section 2b) to the inner circumferential surface of the outer-tube member 3.

The width w of the rubber partition 10 gradually decreases from the side of the inner-tube member 2 toward the side of the outer-tube member 3. The smallest-width point Pw of the rubber partition 10 is positioned inward of the inner circumferential surface of the outer-tube member 3 within 5 mm from the inner circumferential surface of the outer-tube member 3, such that it is located circumferentially outward of the position of the bisection point between the inner circumferential surface and the outer circumferential surface of the rubber partition 10.

In the liquid-sealed-type anti-vibration device 1 of the present invention, a limiting passage 12 may have an arbitrary configuration. For example, as shown in FIG. 1, the limiting passage 12 may be configured such that it extends inside the inner-tube protrusion 9 twice along the circumference of the inner-tube protrusion 9 and is partitioned into two parts in the axial direction. Alternatively, as shown in FIG. 2, the limiting passage 12 may be formed on the outer circumferential surface of the inner-tube protrusion 9.

Figure 2:
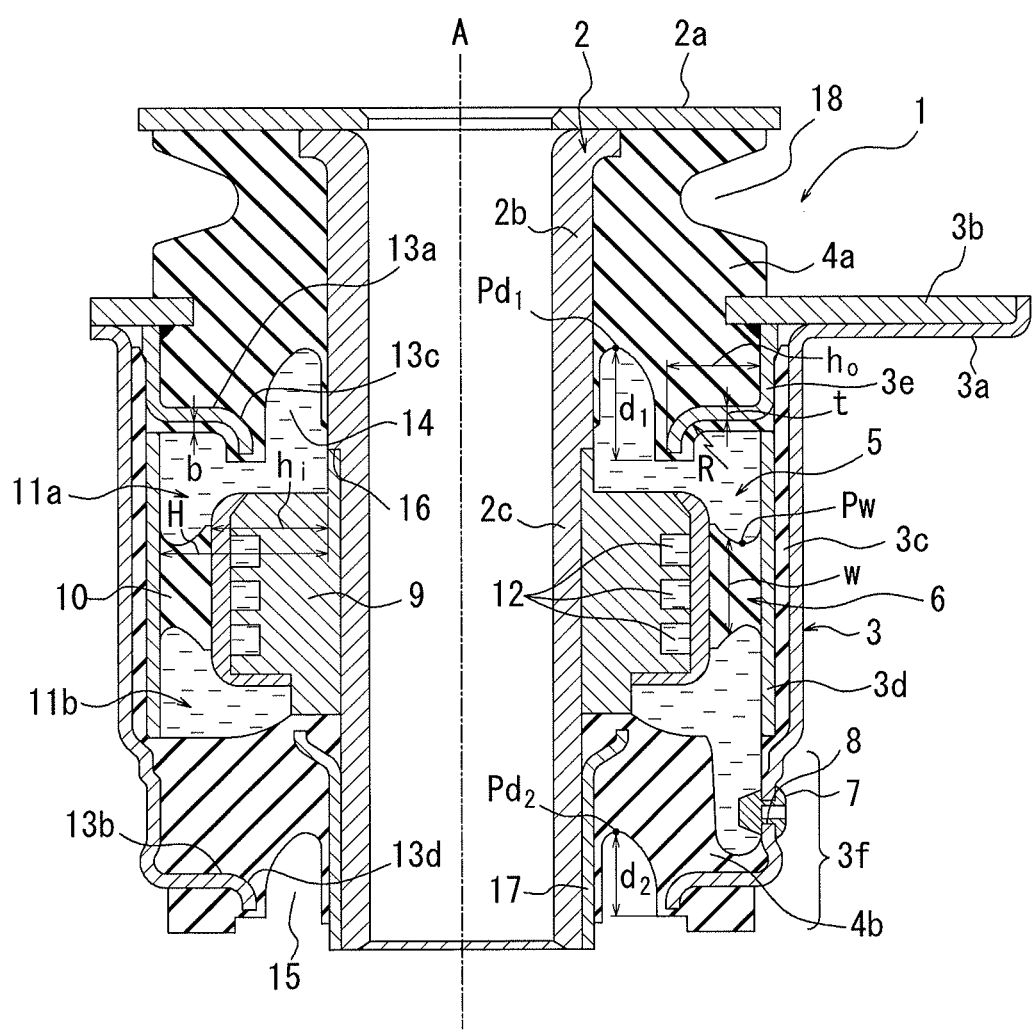
FIG. 2 is a longitudinal sectional view schematically showing another embodiment of a liquid-sealed-type anti-vibration device according to the present invention.

The liquid-sealed-type anti-vibration device 1 shown in FIG. 2 is the same as the liquid sealed-type anti-vibration device 1 shown in FIG. 1, except for the configuration of the limiting passage 12.

Figure 3:
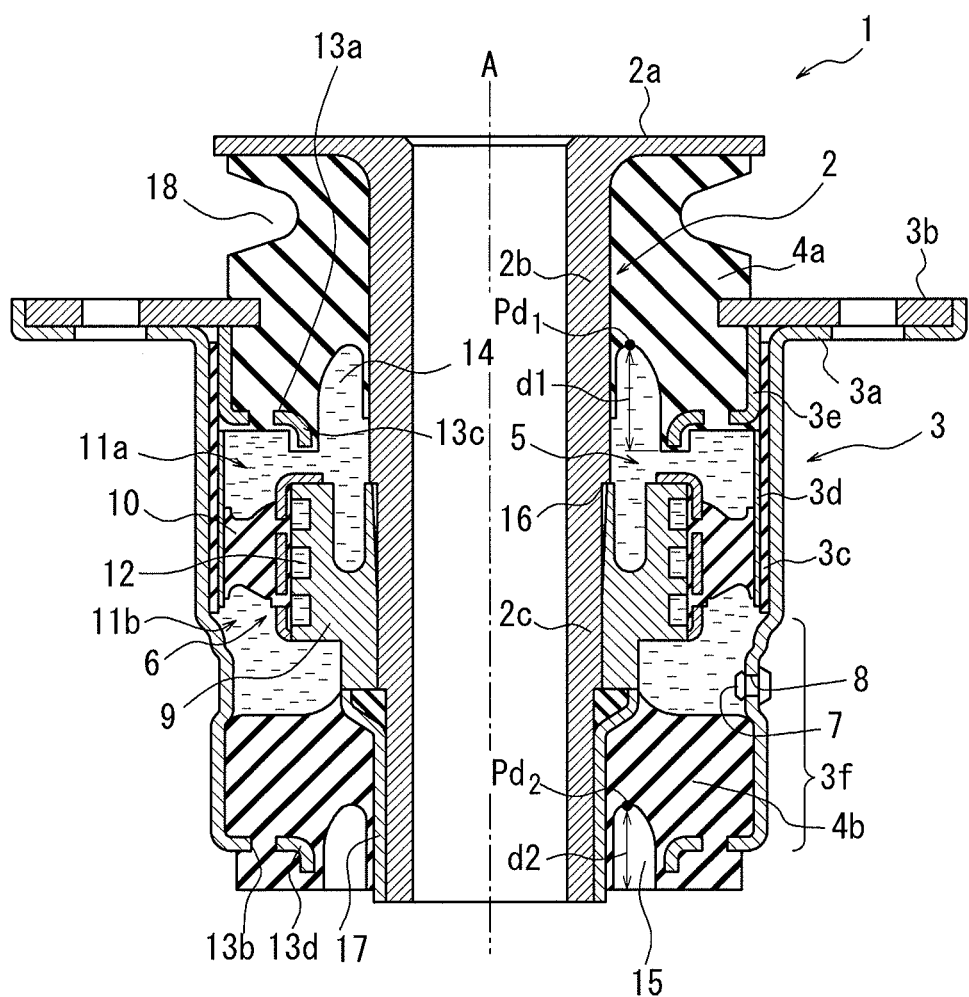
FIG. 3 is a longitudinal sectional view schematically showing another embodiment of a liquid-sealed-type anti-vibration device according to the present invention.

FIG. 3 shows another embodiment, wherein the configuration of the limiting passage 12 is almost similar to the configuration shown in FIG. 2. The annular flange 2a is integrally formed with the vertex section of the inner-tube member 2, which is made of metal for example.

As shown in FIG. 3, the inner-tube rigid protrusion 9 of the partition member 6 is mounted around the inner-tube member 2 in a liquid-tight manner, and the rubber partition 10 is mounted around the rigid protrusion 9 on the side of the outer-tube member 3 in a liquid-tight manner by means of vulcanized adhesion and the like. Alternatively, the rigid portion of the partition member 6 may be mounted on the side of the outer-tube member in a liquid-tight manner, and the rubber partition may be mounted on the side of the inner-tube member in a liquid-tight manner.

In this device, the end portion of the outer-tube member 3 on the side of one of the rubber bodies, e.g. the end portion of the outer-tube member 3 on the side of the second rubber body 4b at lower end in the illustrated example, is provided with a small-diameter end section 3f, which has an outer diameter that is smaller than the outer diameter of the end portion of the outer-tube member 3 on the side of the other rubber body 4a and the outer diameter of the portion of the outer-tube member 3 corresponding to the mounting position of the partition member 6, hence of the rubber partition 10. The small-diameter end section 3f is provided with the liquid injection inlet 8 sealed by the plugging member 7 such as a rivet, a screw, a bolt, and the like. When sealing the liquid injection inlet 8, a portion of the plugging member 7 may protrude from the outer surface of the small-diameter end section 3f. However, since the plugging member 7 is provided at the small-diameter end section 3f of the outer-tube member 3, as long as the protruding section of the plugging member 7 is located within the step between the large-diameter section and the small-diameter section of the outer-tube member 3, it is possible to sufficiently prevent the interference of the protruding section of the plugging member and a predetermined mounting member to which the device is mounted, as the large-diameter portion of the outer-tube member 3 is being inserted or press-fitted and the like into the mounting member.

According to such an anti-vibration device, in response to the axial input, relative vibration and the like of the inner and outer tube members 2 and 3, the rubber bodies 4a, 4b are subjected to shear deformation, and thereby liquid chambers 11a, 11b are subjected to expansion and shrinkage deformation, causing the flow of the liquid inside the liquid chambers through the limiting passage 12. Therefore, the anti-vibration device can achieve an excellent anti-vibration and vibration-damping function.

In the illustrated anti-vibration device, the upper-end first rubber body 4a as shown is fixed to the inner-tube member 2 including its upper-end flange 2a by means of vulcanized adhesion and the like and is also fixed to the inner circumferential surface of the rigid intermediate tube 3e. The rigid reinforcement ring 3b aligned with the upper-end flange 3a of the outer-tube member 3 is provided on the rigid intermediate tube 3e. The intermediate tube 3e is integrated with the rubber body 4a also in such a way that it is entered into the lower-end rubber body 4a.

The partition member 6 of the device has the rigid protrusion 9 mounted around the inner-tube member 2 by means of press-fitting and the like, and the rubber partition 10 fixed to a circumscribed rigid tube member mounted around the outer circumferential surface of the rigid protrusion 9 and to the inner circumferential surface of the support tube 3d by means of vulcanized adhesion and the like. The rigid protrusion 9 as shown has the limiting passage 12 which extends along an arc or extends helically and the like and has a predetermined cross-sectional area and length.

The lower-end second rubber body 4b as shown is fixed to the outer circumferential surface of the rigid sleeve 17 which is mounted around the inner-tube member 2 below the partition member 6 by means of press-fitting and the like, and to the inner circumferential surface of the outer-tube member 3 by means of vulcanized adhesion and the like. The body section of the outer-tube member 3 is mounted to the outer circumferential surface of the intermediate tube 3e and to the outer circumferential surface of the support tube 3d of the partition member 6 via a rubber lining layer disposed on the inner circumferential surface of the body section of the outer-tube member 3 in a liquid-tight manner by means of a diameter reduction process for example, while the upper-end flange 3a is aligned with the rigid reinforcement ring 3b. The end portion of the outer-tube member 3 on the side of the rubber body 4b is provided with the aforementioned small-diameter end section 3f which is located at the position on the outer-tube member 3 corresponding to the lower-end liquid chamber 11b as shown and at the portion on the outer-tube member 3 where the rubber body 4b below the liquid chamber 11b is fixed to. The small-diameter end section 3f has an outer diameter that is smaller than the outer diameter of the end portion of the outer-tube member 3 on the side of the rubber body 4a and the portion of the outer-tube member 3 corresponding to the mounting position of the partition member 6. The small-diameter end section 3f is provided with a liquid injection inlet 8 that is located at the position on the small-diameter end section 3f corresponding to the liquid chamber 11b and is sealed by the plugging member 7 The small-diameter end section 3f is preliminarily formed on the outer-tube member 3. Therefore, after mounting the outer-tube member 3, the process of diameter reduction and the like for forming the small-diameter end section 3f is not required.

When the large-diameter portion of the outer-tube member 3 is inserted, press-fitted and the like into a predetermined mounting member, to which the anti-vibration device is mounted, so as to prepare the anti-vibration device for use for example, the small-diameter end section 3f serves as an insertion guide and the like as the outer-tube member 3 is being inserted into the mounting member. Accordingly, the required inserting, press-fitting and the like may be easily and quickly performed, without the need of the initial, precise positioning of the outer-tube member 3. In this case, the required length of the portion of the outer-tube member 3 to be press-fitted and the like to the mounting member, to which the device is mounted, is made shorter by the length corresponding to the axial length of the small-diameter end section 3f. Accordingly, the frictional force exerted between the outer circumferential surface of the outer-tube member 3 and the inner circumferential surface of the mounting member may be effectively decreased, and thereby the force required to press-in the outer-tube member 3 may be effectively reduced.

Similarly to the first outer-tube rigid protrusion 13a disposed at the lower end of the intermediate tube 3e, the second outer-tube rigid protrusion 13b, which is provided on the end edge of the outer-tube member 3 on the side of the small-diameter end section 3f and enters into the second rubber body 4b, reduces the amount of the shear deformation of the rubber body in response to the relative vibration of the inner and outer tube members 2, 3 in the axial direction, thereby increasing the amount of the increase and decrease of the inner pressure of the liquid chambers. Accordingly, the vibration-damping function of the device using the flow of the sealed fluid may be enhanced.

As shown in FIG. 3, the first rubber body 4a is provided with the cavity 14 extending annularly around the inner-tube member 2 and opening to the liquid chamber 11a, and the second rubber body 4b is provided with the cavity 15 extending annularly around the sleeve 17 and opening to the atmosphere. According to the cavities 14 and 15, it is possible to prevent the separation of the ends of the rubber bodies 4a, 4b that are fixed to the inner-tube member 2 or the sleeve 17 due to concentration of stress.

As shown in FIG. 3, the portion of the inner-tube member 2 where the partition member 6 is mounted to is provided with the small-outer-diameter section 2c having a uniform outer-diameter that is made smaller via a step section. The inner circumferential surface of the rigid protrusion 9, which is press-fitted and the like around the inner-tube member 2, has a tapered surface, such that the inner diameter of the rigid protrusion 9 gradually decreases toward the lower side as shown and that the lower-half portion of the rigid protrusion 9 frictionally engages with the small-outer-diameter section of the inner-tube member 2. Accordingly, it is possible to reduce the force required to press-in the rigid protrusion 9 onto the inner-tube member 2 and to identify the limit position to which the rigid protrusion 9 is press-fitted by the step 16 of the inner-tube member 2.

According to the anti-vibration device, it is possible to isolate the input and vibration from the member on the transmitted side and damp the input and vibration, by the shear deformation of the rubber bodies 4a, 4b in response to the axial input or relative vibration of the inner and outer tube members 2 and 3. The deformation of the rubber bodies 4a, 4b cause the change in the volumes of the liquid chambers 11a and 11b, hence in the pressure of the liquid inside the liquid chambers 11a and 11b, and thereby liquid flows between the liquid chambers 11a, 11b, causing a liquid column resonance inside the limiting passage 12. It is possible to isolate and damp the input and vibration also by the liquid column resonance inside the limiting passage 12 and by the flow resistance of the liquid flowing through the limiting passage 12 and the like.

According to the anti-vibration device described above, after filling the liquid chambers 11a, 11b with required liquid from the liquid injection inlet 8, the injection inlet 8 is sealed by the plugging member 7 such that the pressure of the liquid sealed inside the liquid chambers 11a 11b is at the atmospheric pressure. Therefore it is possible to sufficiently prevent the initial deformation of the rubber bodies 4a, 4b and thereby to effectively eliminate the risk of degradation of the durability of the rubber bodies 4a, 4b. According to the device, since one of the end portions of the outer-tube member 3 is provided with the small-diameter end section 3f, and the small-diameter end section 3f can be preliminarily formed on the outer-tube member 3, it is possible to reduce the number of steps required for a diameter reduction process of the outer-tube member 3 and thereby to effectively reduce the manufacturing cost of the device.

According to the device, since one end portion of the outer-tube member 3 has the small-diameter end section 3f, the small-diameter end section 3f serves as a guiding section as the outer-tube member 3 is being inserted, press-fitted and the like into a predetermined mounting member to which the device is mounted, and thus the required inserting, press-fitting and the like can be performed easily, quickly and always appropriately, without the need to continue precise positioning of the outer-tube member 3 with respect to the mounting member. Further, since only the large-diameter portion of the outer-tube member 3 other than the small-diameter end section 3f needs to be pressed-in and the like to the mounting member, it is possible to effectively reduce the force required to press-in and the like the outer-tube member 3 compared to the case where the large-diameter portion extends along the entire length of the outer-tube member 3.

Another embodiment shown in FIG. 4(a) is particularly different from the embodiment shown in FIG. 3 in that; the small-diameter end section 3f of the outer-tube member 3 is formed only at the portion corresponding to the second rubber body 4b below the portion where the lower liquid chamber 11b is provided; the small-diameter end section 3f is provided with the liquid injection inlet 8 sealed by the plugging member 7; and the liquid injection inlet 8 is connected to the lower liquid chamber 11b via the recess 19 provided in the rubber body 4b. Another embodiment shown in FIG. 4(b) is particularly different from the embodiments shown in FIGS. 3 and 4(a) in that: the rigid protrusion 9 of the partition member 6 is mounted to the outer-tube member 3; and the rubber partition 10 is mounted to the inner-tube member 2 via a rigid tube body 20.

Figure 4:
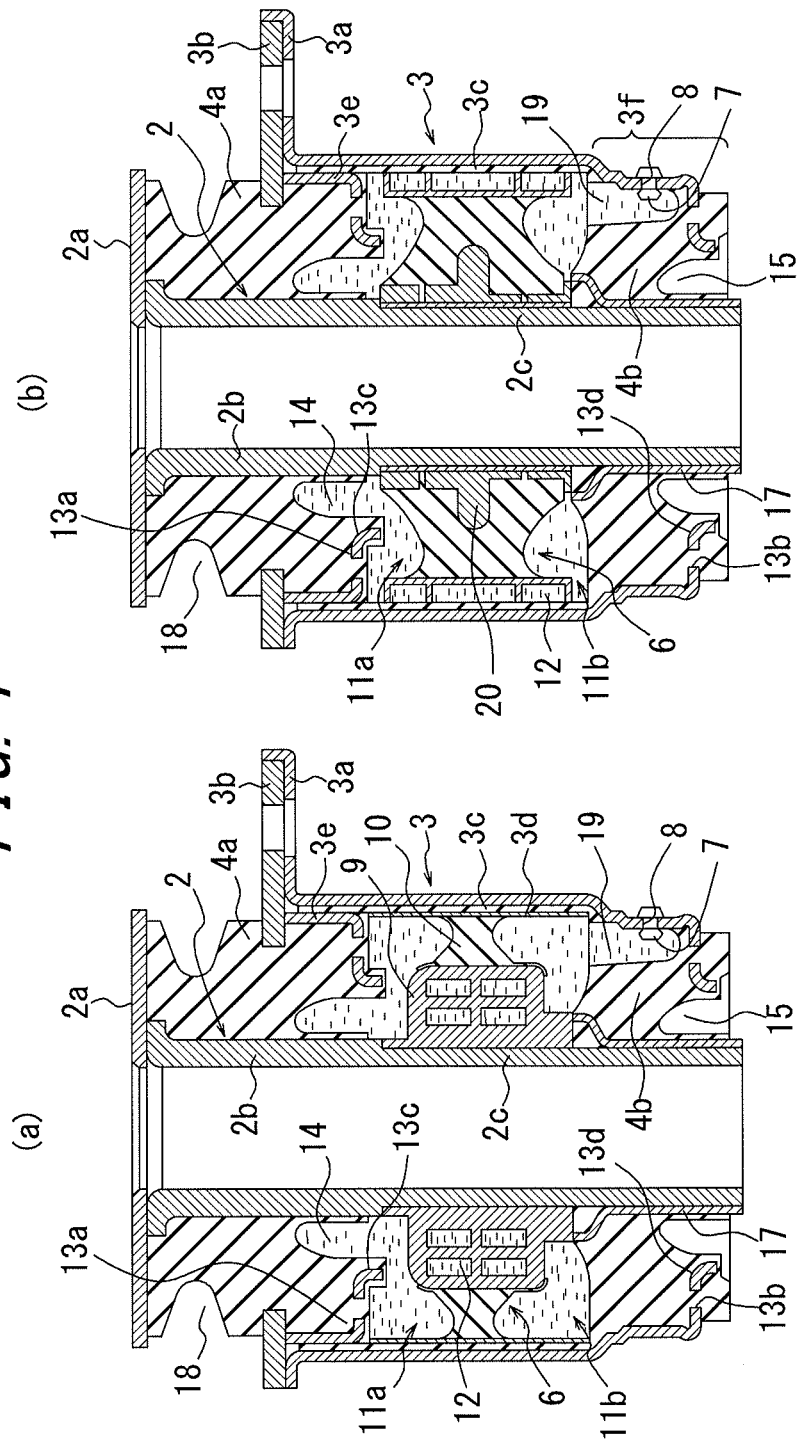
FIG. 4 is a longitudinal sectional view schematically showing further embodiments of a liquid-sealed-type anti-vibration device according to the present invention.

Accordingly, the anti-vibration devices shown in FIG. 4 operate and provide effects similarly to the anti-vibration device shown in FIG. 3.

In the devices shown in FIG. 4, by appropriately choosing the size, shape and the like of the recess 19, the interference of the section of the plugging member 7 for sealing the liquid injection inlet 8, that protrudes toward the inner circumferential side of the outer-tube member 3 and the second rubber body 4b can be easily prevented.

Figure 5:
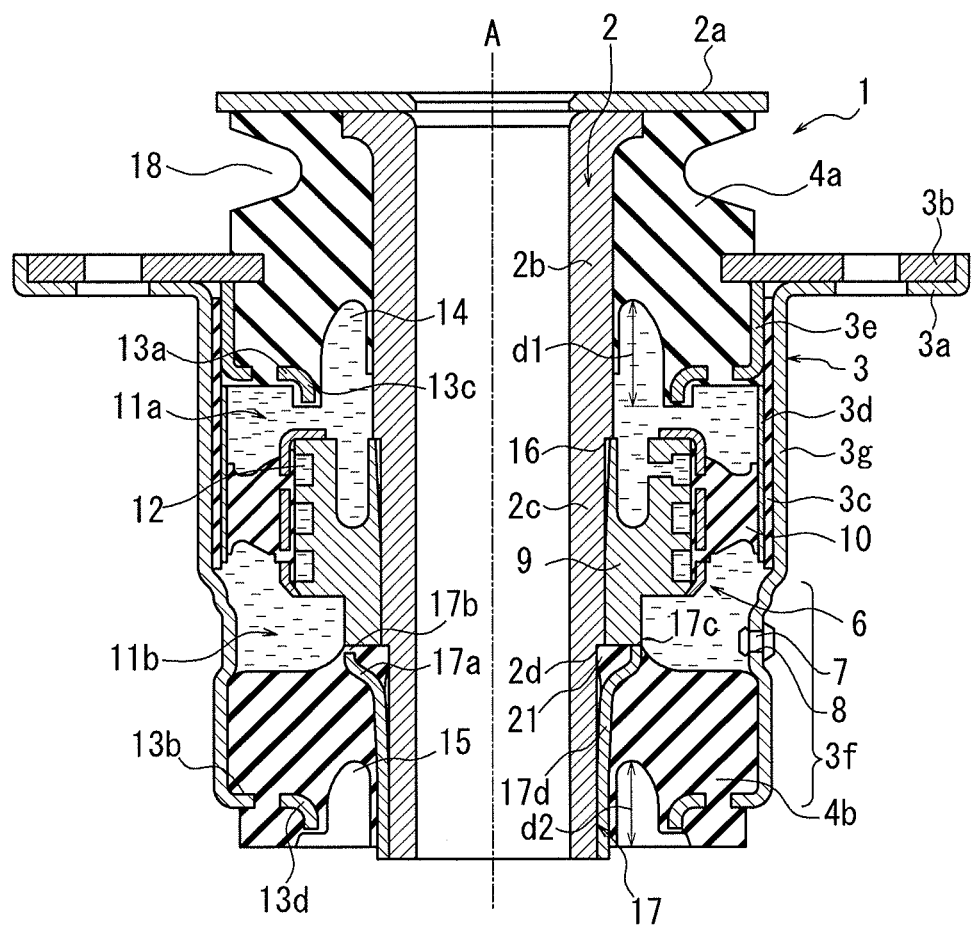
FIG. 5 is a longitudinal sectional view schematically showing another embodiment of a liquid-sealed-type anti-vibration device according to the present invention.

FIG. 5 is a longitudinal sectional view showing a further embodiment. The second rubber 4b located at the lower side as shown is disposed between the outer-tube member 3 and the rigid sleeve 17 disposed circumferentially inward of the outer-tube member 3, and is fixed to the outer-tube member 3 and to the rigid sleeve 17 by means of vulcanized adhesion and the like. The sleeve 17 is frictionally engaged with the outer circumferential surface of the inner-tube member 2, such that the rubber body 4b is connected to the inner-tube member 2 via the sleeve 17.

Figure 6:
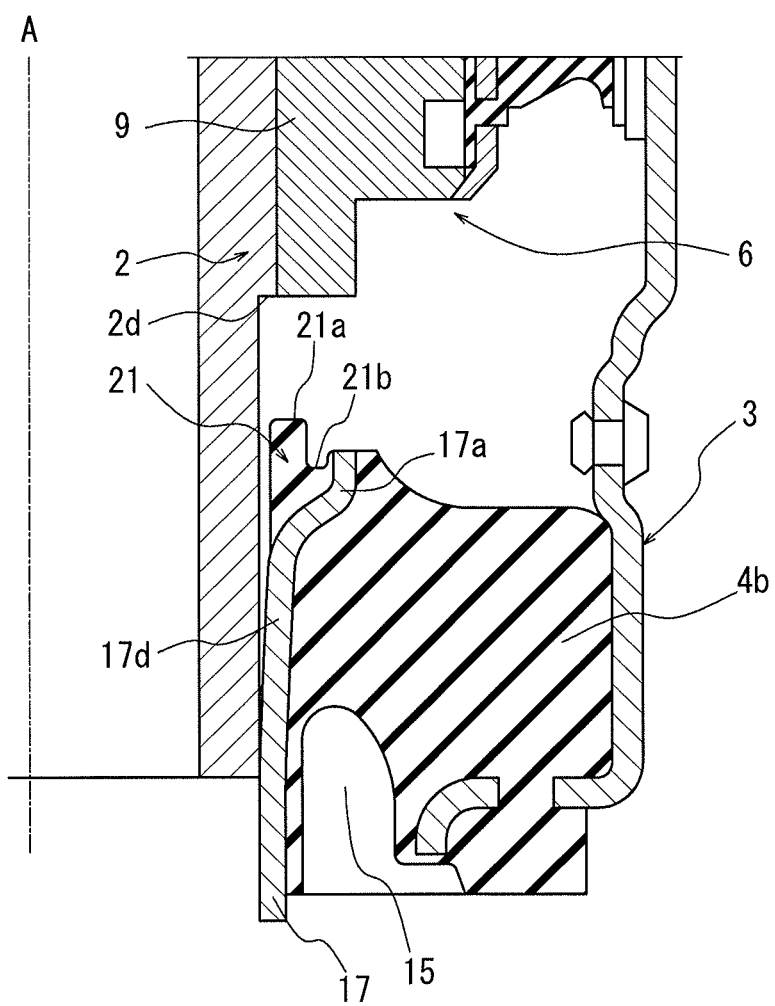
FIG. 6 is partial enlarged sectional view showing the sleeve shown in FIG. 5 in a position before frictionally engaging with an inner-tube member completely.

The diameter of the end portion of the sleeve 17 on the side of the liquid chamber 11b (the upper-end portion as shown) is enlarged compared to the other portion of the sleeve 17 so as to form an enlarged-diameter portion 17a at the end portion, wherein the enlarged-diameter portion 17a has the shape of the trumpet in the illustrated example. An annular elastic member 21 is provided between the enlarged-diameter portion 17a and the outer circumferential surface of the inner-tube member 2 and is integrally formed with the rubber body 4b. FIG. 6 is an enlarged sectional view illustrating the sleeve 17 in a position before frictionally engaging with the outer circumferential surface of the inner-tube member 2 completely. As shown in FIG. 6, the upper surface of the annular elastic member 21 as shown is provided with a protruding section 21a, which sticks out annularly in the direction of the central axis A of the inner-tube member, and with a recess 21b disposed circumferentially outward of the protruding section 21a and extending along an entire circumference.

When the sleeve 17 and the annular elastic member 21 are frictionally engaged with the inner-tube member 2 completely as shown in FIG. 5, the protruding section 21a of the annular elastic member 21 is compressed by the step 2d provided on the outer circumferential surface of the inner-tube member 2 and by the substantially-cylindrical, inner-tube rigid protrusion 9, which makes up the inner circumferential portion of the partition member 6, and deforms away from the inner-tube member 2 and toward the recess 21b, so as to be crimped onto the outer circumferential surface of the inner-tube member 2. Accordingly, the filling ratio of the annular elastic member 21 inside the enlarged-diameter portion 17a is increased, and therefore it is possible to positively prevent the leakage of the sealed liquid from the gap between the sleeve 17 and the inner-tube member 2. Since the sleeve 17 frictionally engages with the outer circumferential surface of the inner-tube member 2 along the rigid portion of the sleeve 17 other than the enlarged-diameter portion 17a, the sleeve 17 may be connected to the inner-tube member 2 in a sufficiently robust manner.

As long as the protruding section 21a to be compressed by the step 2d of the inner-tube member 2 is formed on the annular elastic member 21, it is possible to sufficiently seal the gap between the sleeve 17 and the inner-tube member 2. For this reason, in the present invention, the annular elastic member 21 may be formed without the recess 21b shown in FIG. 6 which allows deformation of the protruding section 21a away from the inner-tube member 2. In the illustrated example, the protruding section 21a is disposed circumferentially inward of the recess 21b, such that, as the protruding section 21a of the annular elastic member 21 is compressed, the annular elastic member 21 is in close contact with the outer circumferential surface of the inner-tube member 2, and the device is more effectively sealed. Alternatively, the inner and outer circumferential positions of the protruding section 21a and the recess 21b, respectively, may be interchanged with each other.

Figure 7:
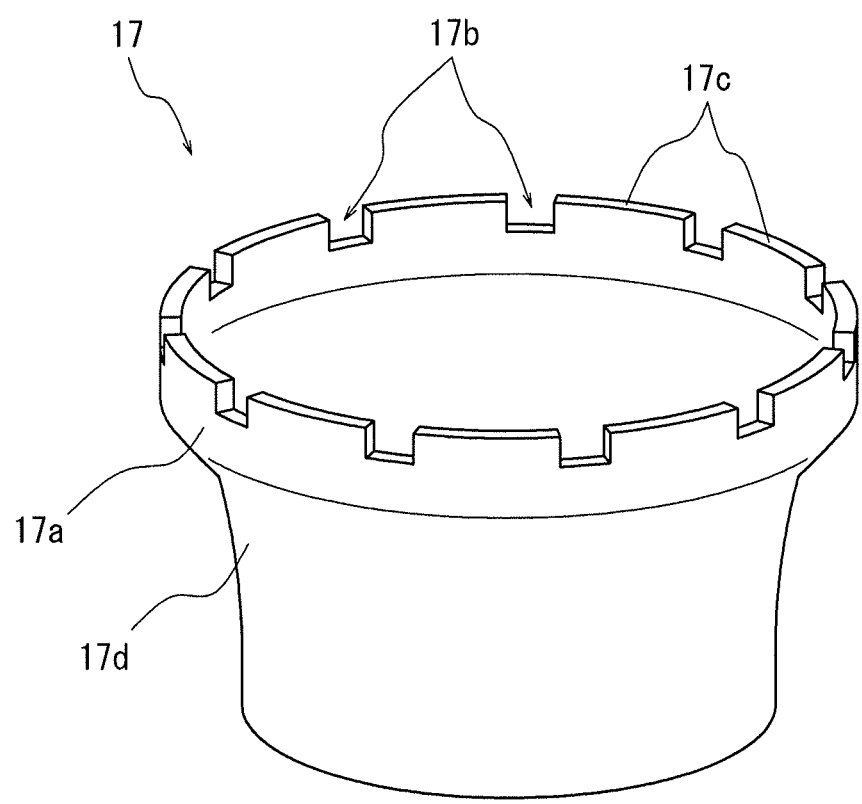
FIG. 7 is a perspective view illustrating the sleeve shown in FIG. 5.

Since the annular elastic member 21 is integrally formed with the rubber body 4b fixed to the outer circumferential surface of the sleeve 17, it is possible to advantageously suppress the increase of the manufacturing cost due to the increase of the number of members and the like. As illustrated in the perspective view of FIG. 7 showing only the rigid sleeve 17, the annularly elastic member 21 may be formed integrally with the rubber body 4b in such a way that the tip of the end portion of the sleeve 17 on the side of the enlarged-diameter portion 17a is provided with a plurality of cutout portions 17b, which are spaced from each other by a predetermined distance in the circumferential direction in the illustrated example, and the annular elastic member 21 and the rubber body 4b are interconnected via the cutout portions 17b.

In a case where the annular elastic member 21 is integrally formed with the rubber body 4b via the cutout portions 17b as described above, the rigid portions 17c of the tip of the sleeve 17 other than the cutout portions 17b may be abutted on the rigid protrusion 9 of the partition member 6 as shown, while the sleeve 17 is in engagement with the inner-tube member 2 as shown in FIG. 5. Accordingly, it is possible to always positively position the sleeve 17 with respect to the rigid protrusion 9 at the time of mounting the sleeve 17, and to prevent the displacement of the sleeve 17 with respect to the inner-tube member 2 as the device 1 is in use and the like by means of the rigid abutment.

In order to reduce the force required to press-fit the sleeve 17 onto the outer circumferential surface of the inner-tube member 2 during the assembling of the members of the device 1, it is preferable that, as shown in FIGS. 5 and 6, the portion 17d of the sleeve 17 adjacent to the enlarged-diameter portion 17a has a tapered shape such that the diameter of the portion 17d increases toward the partition member 6. Even in a case where the sleeve 17 has such a tapered shape, since the lower-end region of the sleeve 17 as shown is sufficiently in frictional engagement with the outer circumferential surface of the inner-tube member 2 in the anti-vibration device of the present invention, and since the annular elastic member 21, with its protruding section 21a being compressed, is in close contact with the outer circumferential surface of the inner-tube member 2 as described above, it is possible to positively prevent the leakage of the sealed liquid from the gap between the sleeve 17 and the inner-tube member 2.

It is preferable that the inner diameter of the annular elastic member 21 in the position before completely engaging with the inner-tube member 2 as shown in FIG. 6 is larger than the outer diameter of the inner-tube member 2. Accordingly, as the annular elastic member 21 and the sleeve 17 are being fitted to the outer circumferential surface of the inner-tube member 2, the annular elastic member 21 is not rubbed on the outer circumferential surface of the inner-tube member 2. Therefore the damaging of the annular elastic member 21 may be effectively prevented. Even in this case, since the protruding section 21a of the annular elastic member 21 is compressed by the step 2d of the inner-tube member 2 and the like, as shown in FIG. 5, a portion of the protruding section 21a, which deforms away from the inner-tube member 2, positively fills the gap between the annular elastic member 21 and the inner-tube member 2, thereby ensuring the seal performance of the annular elastic member 21.

When manufacturing the anti-vibration device 1, the members are assembled as follows: first of all, as shown in the exploded sectional view of FIG. 8(a), the inner-tube member 2 and the intermediate tube 3e surrounding one end side of the inner-tube member 2 are connected with each other by the first rubber body 4a; the inner-tube rigid protrusion 9, which makes up the inner circumferential portion of the partition member 6, is fitted to an inner-tube-side member 22 from the other end side of the inner-tube member 2, wherein the inner-tube-side portion 22 is configured by integrally connecting the annular flange 2a onto the end section of the inner-tube member 2 on the one end side; and the rigid protrusion 9 is frictionally engaged around the inner-tube member 2.

Figure 8:
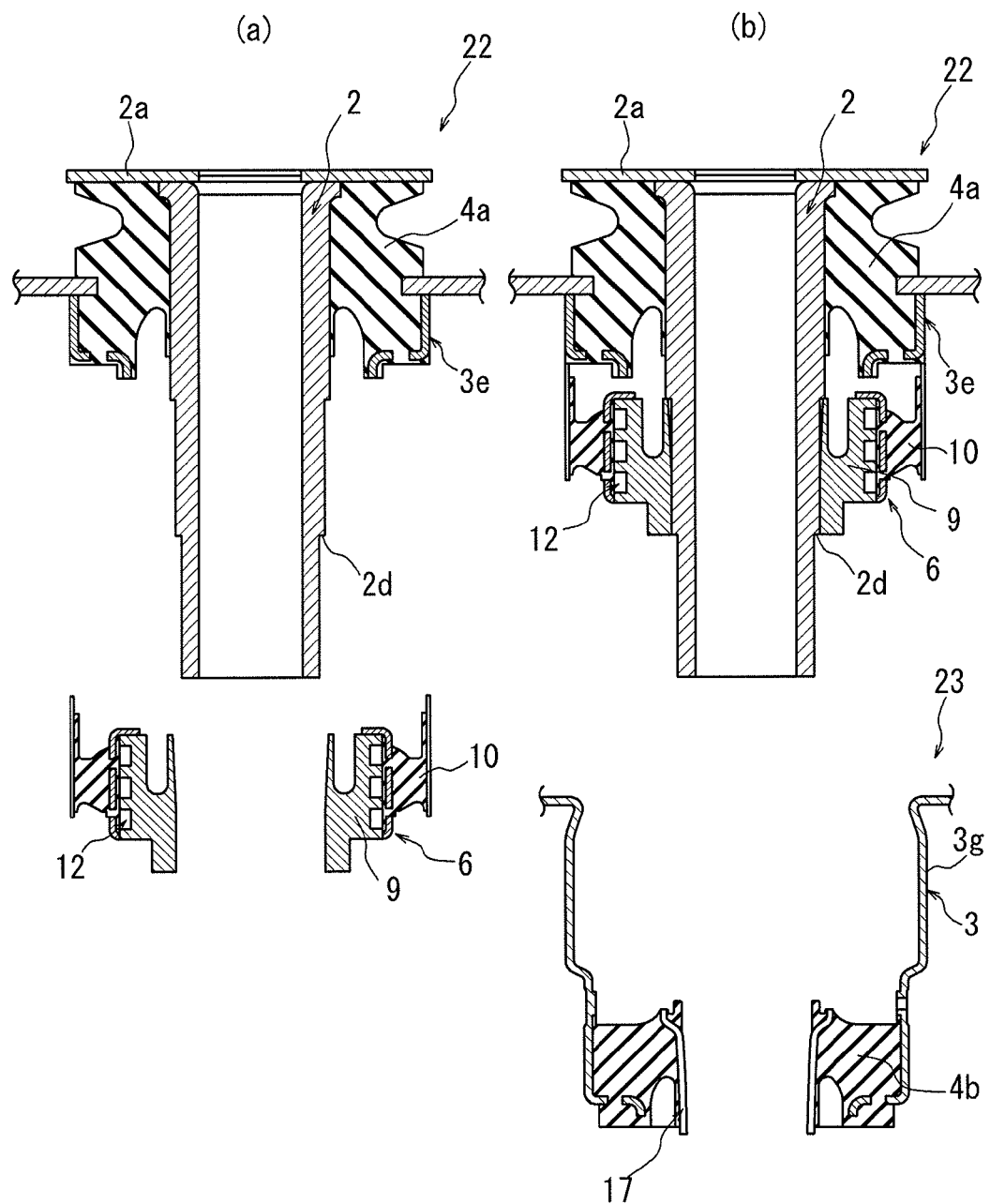
FIG. 8 is an exploded sectional view showing the steps of assembling the members of the anti-vibration device shown in FIG. 5.
Figure 10:
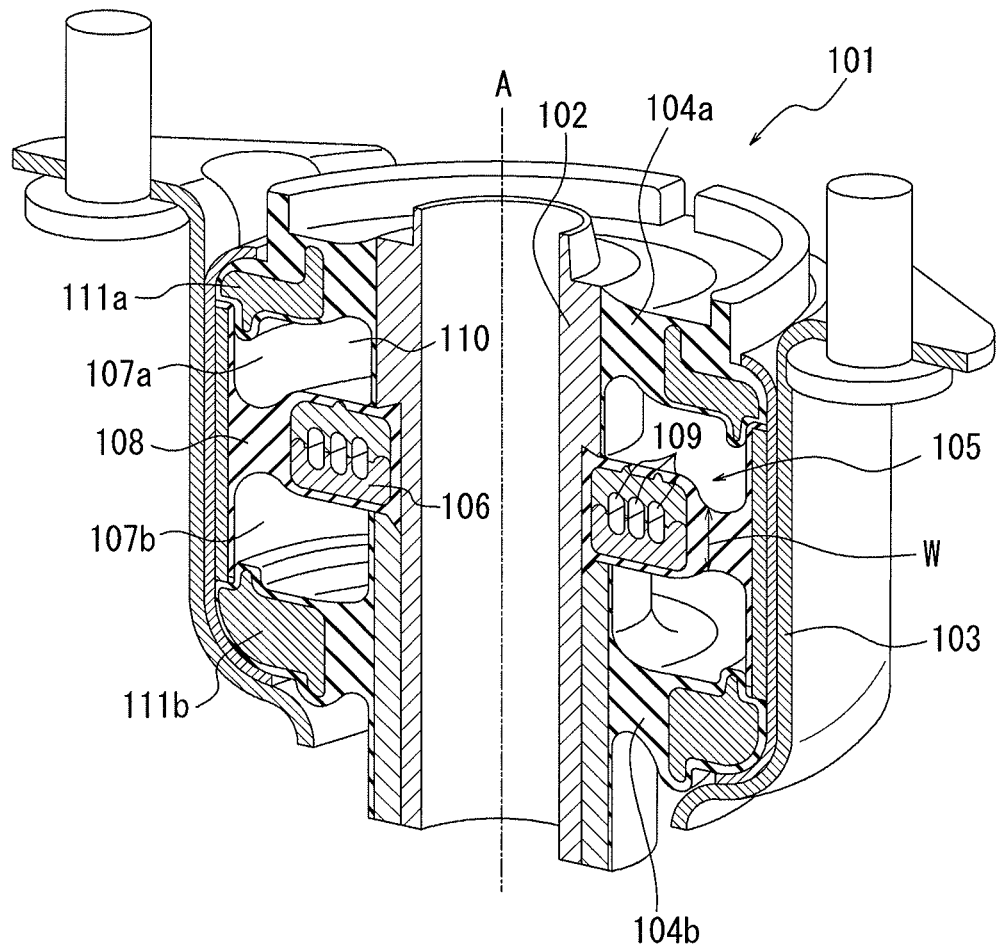
FIG. 10 is a longitudinal sectional perspective view schematically showing a conventional device.

Subsequently, as shown in FIG. 8(b), an outer-tube-side portion 23 is fitted to the outer circumferential surface of the inner-tube member 2 via the sleeve 17 of the outer-tube-side portion 23 so as to be frictionally engaged with the inner-tube member 2, wherein the outer-tube-side portion 23 is configured by connecting the outer circumferential surface of the sleeve 17 and inner circumferential surface of the outer-tube member 3 with each other by the rubber body 4b. Lastly, the enlarged-diameter tube section 3g of the outer-tube member 3 is subjected to drawing for diameter reduction so as to tightly secure the intermediate tube 3e by the plastic deformation of the enlarged-diameter tube section 3g, wherein the intermediate tube 3e is disposed circumferentially inward of the enlarged-diameter tube section 3g.

When subjecting the enlarged-diameter tube section 3g of the outer-tube member 3 to drawing, the following is preferable: as shown in FIG. 9, the upper-end flange 3a of the outer-tube member 3 is preliminarily formed with a cylindrical standing-up section 3h covering the side and vertex surfaces of the rigid reinforcement ring 3b; and prior to the drawing of the enlarged-diameter tube section 3g, as shown in the sectional perspective views of FIGS. 9(a) and 9(b), the cylindrical standing-up section 3h, provided on at least a portion of the upper-end flange 3a, is bended over inward for plastic deformation so as to fixedly sandwich the rigid reinforcement ring 3b with the upper-end flange 3a of the outer-tube member 3.

Accordingly, it is possible to suppress the downward bending of the upper-end flange 3a as shown (shown by the virtual arrow A in FIG. 9(a)) due to the drawing of the enlarged-diameter tube section 3g. Therefore the outer-tube member 3 may be positively mounted to the desired position on the inner-tube-side portion 22. As a result, the quality of the anti-vibration device 1 may be enhanced.

The invention claimed is:

1. A liquid-sealed-type anti-vibration device comprising:
an inner-tube member to be connected to a member on either one of a vibration-generating side and a vibration-transmitted side;
an outer-tube member located outside of the inner-tube member to be connected to a member on the other one of the vibration-generating side and the vibration-transmitted side;
a first rubber body for connecting one end of the outer-tube member with an outer circumferential surface of the inner-tube member in a liquid-tight manner;
a second rubber body for connecting the other end of the outer-tube member with the outer circumferential surface of the inner-tube member in a liquid-tight manner;
a fluid chamber configured in such a way that a space defined by the first rubber body, the second rubber body, the inner-tube member and the outer-tube member is sealingly filled with non-compressible liquid, wherein
the inner-tube member is provided with an inner-tube rigid protrusion at an intermediate section of the inner-tube member in an axial direction, the protrusion protruding from the outer circumferential surface of the inner-tube member toward the outer-tube member and extending over an entire circumference of the inner-tube member, a rubber partition is provided to connect an outer circumferential surface of the inner-tube rigid protrusion and an inner circumferential surface of the outer-tube member with each other in a liquid-tight manner to divide the fluid chamber into two liquid chambers with the inner-tube rigid protrusion, and the inner-tube rigid protrusion is provided with a limiting passage which allows the liquid chambers to communicate with each other,
the outer-tube member has a first outer-tube rigid protrusion protruding from the inner circumferential surface of the outer-tube member toward the inner-tube member through the first rubber body and having a shape of an inward flange; and a second outer-tube rigid protrusion protruding from the inner circumferential surface of the outer-tube member toward the inner-tube member through the second rubber body and having a shape of an inward flange, and at least one of the first outer-tube rigid protrusion and the second outer-tube rigid protrusion is located on the side of the liquid chamber, and each of the first rubber body and the second rubber body is provided with a ring-shaped cavity extending inside the respective rubber body along the outer circumferential surface of the inner-tube member and having a depth, in a section that includes a central axis of the inner-tube member and that is taken along the central axis, axially extending past the first outer-tube rigid protrusion or the second outer-tube rigid protrusion, at least one of the cavities facing one of the liquid chambers;

the limiting passage is provided within the inner-tube rigid protrusion;

the first outer-tube rigid protrusion protrudes from the inner circumferential surface of the outer-tube member toward the inner-tube member; and the second outer-tube rigid protrusion protrudes from the inner circumferential surface of the outer-tube member toward the inner-tube member.

2. A liquid-sealed-type anti-vibration device according to claim 1, wherein, in the section, an inner-circumferential end portion of at least one of the first outer-tube rigid protrusion and the second outer-tube rigid protrusion is curved toward the inner-tube rigid protrusion, and a vertex surface or a bottom surface of the cavity provided in the first rubber body or the second rubber body in which the respective outer-tube rigid protrusion is embedded, has a mild convex curved shape.

3. A liquid-sealed-type anti-vibration device according to claim 1, wherein a protruding height of the inner-tube rigid protrusion from a largest-outer-diameter section of the inner-tube member is in a range of 50%-80% of a radial distance from the largest-outer-diameter section to an inner circumferential surface of a body of the outer-tube member, and protruding heights of the first outer-tube rigid protrusion and the second outer-tube rigid protrusion are in a range of 50%-80% of the radial distance from the largest-outer-diameter section to an inner circumferential surface of a body of the outer-tube member.

4. A liquid-sealed-type anti-vibration device according to claim 1, wherein a thickness of the rubber partition in the axial direction is the shortest at a region located circumferentially outward of midpoint between an inner circumferential surface and an outer circumferential surface of the rubber partition.

5. A liquid-sealed-type anti-vibration device according to claim 1, wherein an end portion of the outer-tube member on the side of one of the rubber bodies is provided with a small-diameter end section having an outer diameter smaller than an outer diameter of an end portion of the outer-tube member on the side of the other one of the rubber bodies and an outer diameter of a portion of the outer-tube member corresponding to the mounting position of the rubber partition, and the small-diameter end section is provided with a liquid injection inlet sealed by a plugging member.

6. A method for manufacturing a liquid-sealed-type anti-vibration device according to claim 5, the method comprising:

injecting liquid from the liquid injection inlet provided in the outer-tube member after assembling of component members of the device, and subsequently to the injecting, sealing the liquid injection inlet by the plugging member.

\* \* \* \* \*